Figure 1:

INVENTORS
LLOYD H. BELZ
LLOYD A. COOK
LAVERNE W. EASTWOOD

BY James E. Toomey

ATTORNEY

Sept. 16, 1958 L. H. BELZ ET AL 2,852,659
METHOD OF WELDING APPARATUS AND ELECTRODE
Filed June 30, 1954 2 Sheets-Sheet 2

INVENTORS
LLOYD H. BELZ
LLOYD A. COOK
LaVERNE W. EASTWOOD
BY James E. Toomey
ATTORNEY

United States Patent Office 2,852,659
Patented Sept. 16, 1958

2,852,659

METHOD OF WELDING, APPARATUS, AND ELECTRODE

Lloyd H. Belz, Newman Lake, Lloyd A. Cook, Spokane, and La Verne W. Eastwood, Veradale, Wash., assignors to Kaiser Aluminum & Chemical Corporation, Oakland, Calif., a corporation of Delaware Application June 30, 1954, Serial No. 440,356

22 Claims. (Cl. 219—74)

This invention relates to electric arc welding methods and apparatus. More particularly, this invention relates to improvements in the method and apparatus for inert gas shielded arc welding of aluminum and aluminum alloys.

In the art of welding aluminum and aluminum alloys, the use of inert gas shielded arc welding is common practice today. Such welding practice includes the use of either consumable or nonconsumable electrodes and customarily is either automatic or semi-automatic in operation. Although not limited thereto, the present invention has particular application in welding practices utilizing a consumable electrode, one widely used practice being characterized as semi-automatic welding wherein a filler wire, preferably bare, constituting a consumable electrode is fed automatically to a hand gun held by the operator and wherein by actuation of the gun trigger the bare filler wire is fed to a welding arc within an envelope of shielding gas, e. g., argon, helium, or mixtures thereof and which gas also blankets the molten metal weld pool. In such a process the operator moves the gun manually so that the point of the wire electrode follows the seam to be welded and as the welding operation proceeds the filler wire is fed automatically into and through the hand gun held by the operator. One example of conventional apparatus for performing semi-automatic welding is disclosed in Muller et al., Patent No. 2,504,868 and wherein the apparatus generally comprises a gas cylinder for supplying the inert gas to the welding gun for shielding the arc, a reel of electrode wire with suitable electrical means for feeding the wire to the gun, a suitable direct current welding generator for providing current for the arc and wherein the negative terminal of the generator is connected to the work piece and the positive terminal to the electrode, thus providing what is characterized as reverse polarity for the welding arc, and suitable means to control the flow of shielding gas, the passage of current through the electrode wire, and actuation of the electrode wire feeding means.

Although aluminum and aluminum alloys are readily joined by the inert gas shielded arc welding method, using either a consumable or non-consumable electrode and being either automatic or semi-automatic, it has been found that it is extremely difficult to consistently produce sound welds due to the presence of porosity therein. The unsoundness encountered is believed to be caused by entrained gases with or without accompanying dross films and/or dissolved gases which precipitate on solidification of the weld metal. In the past, major efforts to improve weld soundness have been directed along the lines of improving the filler metal wire surface characteristics, controlling the arc variables, particularly the voltage and current, controlling the surface preparation of the workpiece, puddling in the weld pool, use of stringer-bead techniques, and controlling weld joint design. Such efforts, however, have not been productive of a process for the inert gas shielded arc welding of aluminum and aluminum alloys which will consistently give high quality welds. Moreover, weld unsoundness is aggravated by the use of multiple pass welds, which are used in some instances, and by vertical or overhead welding where the use of rapid freeze welding techniques are necessary.

Accordingly, the primary purpose and object of the invention is to provide an improved method for the welding of aluminum and aluminum alloys.

Another object of the invention is to provide an improved method and apparatus for the inert gas shielded arc welding of aluminum and aluminum alloys which is productive of welds wherein the presence of porosity has been eliminated or substantially reduced.

Another object of the invention is to provide an improved method of inert gas shielded arc welding of aluminum and aluminum alloys with a consumable electrode involving the provision of a gas shielding atmosphere which provides good arc characteristics and provides consistently sound welds.

Another object of the invention is to provide an improved apparatus for use in the inert gas shielded arc welding of aluminum and aluminum alloys and which includes means for modifying the inert gas shield such that the presence of porosity in the weld is eliminated or substantially reduced.

A further object of the invention is to provide a novel electrode for use in the inert gas shielded arc welding of aluminum and aluminum alloys.

Other objects and advantages of the invention will be apparent from the following detailed description and the accompanying drawings which will be discussed hereinafter.

In accordance with the method of the invention, an arc is established between the workpiece and the electrode, which electrode may be of the consumable type, wherein it is fed from a source to the welding head, or of the non-consumable type. A gaseous atmosphere is supplied and delivered to a point where it surrounds the arc and blankets the workpiece and is in intimate contact with the arc and the molten metal weld pool so that the weld zone, i. e., the weld pool and arc area, is protected from the natural atmosphere. The shielding atmosphere is composed of a mixture of inert gas, e. g., argon, helium, or mixtures thereof, and a small but effective amount of one or more suitable halides, the halides being free or essentially free of the elements carbon and hydrogen. Some halogen in elemental state may also be present. Hydrogen is undesirable since it is soluble in molten aluminum and precipitates on solidification of the weld metal producing porosity which is just the opposite of the objects of the present invention. Carbon is undesirable in that carbon-containing halides in contact with the arc produce carbon deposits in the weld area which may be entrapped as carbon inclusions in the weld. In addition, carbon-containing halides in contact with the arc form extremely toxic compounds such as phosgene. Moreover, the arc is very sensitive to the presence of carbon and hydrogen in the form of halides in the gas shield thereby resulting in arc instability. The source of the halide can be in the form of a halide or it can be halogen in elemental state. Depending on the source material used, it may be in the liquid, gaseous, or solid state. Where the halogen is utilized it is converted to halide, at least in part, in the weld zone in the presence of the molten aluminum weld pool. Examples of suitable halides are magnesium chloride, sodium chloride, aluminum trichloride, zirconium tetrachloride, silicon tetrachloride, titanium tetrachloride, boron trichloride, and boron trifluoride. It is to be understood that the halogen in elemental state may be solely used in admixture with the inert shielding gas or a combination of halogen and halide may be mixed with the inert gas and wherein the halogen and/or halide is in intimate contact with the weld zone, i. e., the arc and the weld pool.

Although in the instant invention the halogen or halide can be in various forms, the presently preferred practice of the invention is to utilize the halogen chlorine in gaseous state and which is admixed in suitable proportions with the inert gas. It has been found that excellent results can be achieved where the halogen is present in the shielding gas in amounts as small as about 0.01% by volume. The preferred range of halogen amount is from about 0.05 to 0.5%. Amounts larger than 0.5%, e. g. 2%, have been used but no advantage has been seen to flow therefrom. Moreover, the use of larger amounts of halogen may present a serious problem regarding safety of the workman due to excessive inhalation of same. In addition, it has been found in the welding of aluminum alloys containing relatively large amounts of magnesium as an alloying constituent that the use of halogen in amounts much greater than 0.5% resulted in excessive removal of magnesium from the weld metal thereby giving a marked reduction in weld strength, although the welds were found to be free or essentially free from porosity.

The improved results obtained by practice of the invention are more fully illustrated with reference to the various radiographs shown in the accompanying drawings, Figures 1 to 4. Radiography is a nondestructive test method which shows the presence and nature of microscopic defects or other structural discontinuities in the interior of welds. Radiographic examination for weld soundness is standard practice. Figures 1 to 4 represent the results of square-butt, one-pass welds made in flat position between ¼" plate sections of an aluminum alloy having a chemical composition of approximately 4.6% magnesium, 0.75% manganese, balance aluminum and normal impurities. The welding process used in making the welds was inert gas shielded arc welding with a consumable filler metal electrode wire having a chemical composition substantially the same as that of the parent metal. The inert gas used in making all welds was argon and the halogen, where used, was chlorine gas, the total gas flow being approximately 60 cubic feet per hour. A welding current of about 225 amperes and an arc voltage of about 24 volts was used. In addition to radiographic examination, the welds were subjected to tensile tests. Preparatory to tensile testing, the weld beads were machined off to cause ultimate fracture of the tensile specimens to occur in the weld for the purpose of permitting visual inspection of the quality of the weld metal.

Figure 1 illustrates the radiograph of a typical weld made by conventional practice wherein the shielding gas was comprised solely of argon. Note the large amount of porosity existing in the weld metal. Weld metal of this quality possesses an ultimate tensile strength of about 36,500 p. s. i., a yield strength of about 21,800 p. s. i., and an elongation of about 8.3%.

Figure 2:
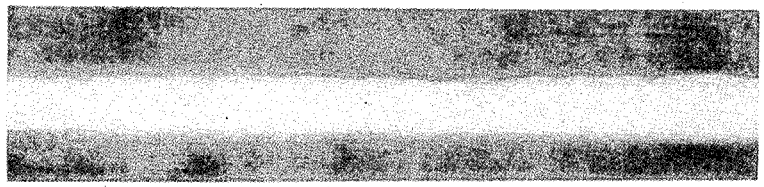
Figure 3:
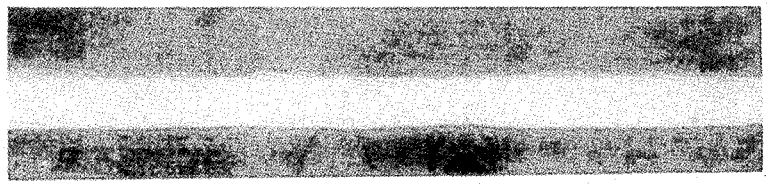
Figure 4:

Figures 2, 3, and 4 illustrate radiographs of welds made by the same basic welding method but wherein different amounts of chlorine gas were mixed with the argon shielding gas. In making the weld shown in Figure 2 the rate of gas flow of about 60 cubic feet per hour included about 0.03 cubic foot of chlorine gas. In other words, chlorine was present in the shielding gas in an amount of about 0.05%. The weld shown in Figure 3 was made using the same shielding gas flow rate but which included about 0.09 cubic foot of chlorine or, in other words, the chlorine was present in amount of about 0.15%. The weld shown in Figure 4 was made using a similar shielding gas flow rate but which included about 0.15 cubic foot of chlorine, or in other words, the chlorine was present in amount of about 0.25%. Note the freedom or essential freedom from porosity in these welds made by practice of the instant invention.

Upon fracturing the welds by subjecting them to tensile stress, the weld of Figure 2 was found to possess an ultimate tensile strength of about 41,600 p. s. i., a yield strength of about 23,300 p. s. i., and an elongation of about 12.2%. The weld of Figure 3 had an ultimate tensile strength of about 41,000 p. s. i., a yield strength of about 22,700 p. s. i., and an elongation of about 12.8%. The weld of Figure 4 had an ultimate tensile strength of about 41,300 p. s. i., a yield strength of about 22,800 p. s. i., and an elongation of about 12.9%. It will be noted, as mentioned hereinabove, that the electrode filler metal wire possessed a magnesium content substantially the same as that of the parent metal. The mechanical properties of these welds (Figures 2–4) can be readily increased further, in comparison to welds made by conventional practice, by using a slightly higher magnesium content in the electrode filler metal wire thereby compensating for a slight loss of magnesium occasioned by the use of the halogen.

It will be readily seen from Figures 2 to 4 that by practice of the instant invention the soundness of welds has been greatly increased and a significant increase in strength of the welds has been produced as distinguished from conventional welding practices as heretofore used.

Although the embodiment of the basic inventive concept set forth hereinabove is preferred from the standpoints of cost, control, and use of conventional filler metal wires, it is to be understood that the invention includes various other embodiments which can be satisfactorily utilized, where desired. One such embodiment is to provide the halide in the form of a coating on the filler metal wire. Another embodiment is to incorporate halide or halides in the filler metal wire. This can be accomplished in various ways as by providing a core hole in an ingot or billet of the desired filler metal, filling the hole with a suitable halide or halides in given proportions, sealing the ends of the core hole, and then working, as by forging and drawing, the ingot or billet down to filler metal wire of proper size. For example, filler metal wires have been produced having cores of materials such as an aluminum and sodium chloride mixture, sodium chloride, magnesium chloride, aluminum chloride, and a mixture of aluminum and magnesium chloride. In preparing such wires the core material is generally added in powder form although in some instances the material can be added to the ingot or billet in the molten form. The filler wire may also be produced by mixing the halide or halides with aluminum or aluminum alloy powder, compressing the mixture, and extruding and drawing down to the desired filler metal wire size. Numerous welds have been made on aluminum alloy plate utilizing such electrode wires as hereinabove described with the resulting welds greatly improved in soundness as distinguished from the use of conventional filler metal wire not incorporating the halides.

Figure 5:
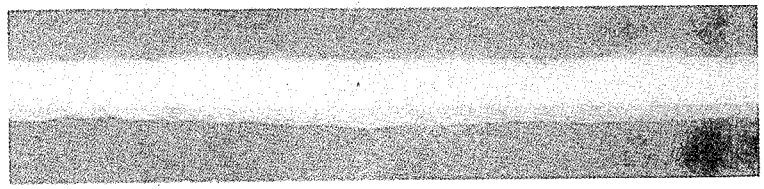

As a specific example of the practice of the embodiment of the invention using halide incorporated in the filler metal wire, a rod was prepared of an aluminum alloy having a chemical composition of about 5.2% magnesium, 0.1% manganese, 0.1% chromium, balance aluminum and normal impurities. The rod size was 1" in diameter by 2' in length. A closed bottom hole about ⅛" in diameter was provided lengthwise of said rod and the hole filled with powdered magnesium chloride. The open end of the hole was then welded close. The rod was heated, hot rolled into ⅜" rod, and subjected to alternate annealing and drawing operations to produce 1/16" filler metal wire. Square-butt welds between workpieces comprising ¼" plate of an aluminum alloy having an approximate chemical composition of 4.6% magnesium, 0.75% manganese, balance aluminum and normal impurities, were made using the above electrode filler metal wire in the conventional inert gas shield arc welding process as discussed above with regard to Figure 1 with the result that sound welds were produced. Figure 5 illustrates a representative radiograph of such welds.

Another embodiment of the present invention is to provide halide of suitable composition in the liquid or solid state and wherein the inert gas is passed in contact therewith thereby picking up halide and carrying same as part of the arc shielding gas. For example, the inert gas can be bubbled through a container of liquid titanium tetrachloride or tetrabromide and then passed to the welding head for arc shielding purposes. Solid aluminum trichloride has been placed in a container which was heated to cause vaporization of the chloride and the inert gas passed therethrough thereby providing the necessary halide content in the shielding gas. The quantity of halide desired will depend in any given instance upon factors such as composition of the filler metal and parent metal, the surface condition of the metals involved, and the general welding apparatus system to be used. Control of the amount of halide in the shielding gas may be had by means of regulation of the temperature of the halide, solid or liquid, the length of passage of the inert gas through the solid or liquid halide, and the amount and rate of flow of the inert gas therethrough. In any given case only a nominal amount of experimentation is necessary to determine the most desirable amount of halide to be used.

Figure 6:
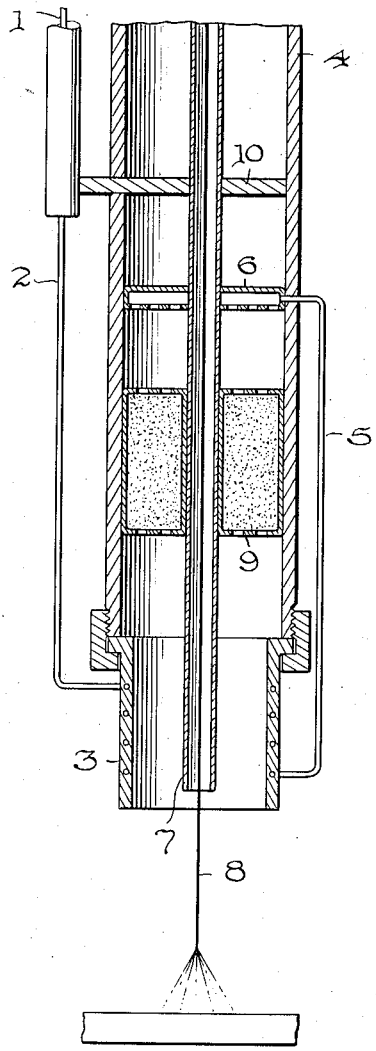

With regard to the above use of a container for holding the halide, the conventional inert gas shielded arc welding head or gun can be modified to include the provision of the container therein. In one conventional type of welding gun use is made of water to cool the electrical lead to the gun and to cool the cup or tip at the forward end of the gun. Such a gun can be modified as shown in Figure 6 which is a diagrammatic illustration, partly in section, of the forward portion of such modified welding gun. With reference to the drawing, an aluminum or copper cable 1 is used to bring the electric power to the gun. The cable is cooled with the inert shielding gas passing through conduit 2 in a direction toward the forward end of the gun. The inert gas, after passing over the cable, passes through cup or tip 3 at the forward end of the gun barrel 4 thereby cooling the cup and also heating the inert gas. As the gas leaves the cup 3 it passes back along a conduit 5 which is connected in gas flow relationship with a perforated diaphragm 6 which allows the gas to pass out within barrel 4 which surrounds the wire guide tube and filler wire 7 and 8, respectively, and in a direction toward cup 3. The power contact to the guide tube is designed as member 10. As the gas passes toward cup 3 it is caused to pass through a cylinder 9 containing solid halide in particulate form, e. g., aluminum chloride powder, and the relatively high temperature of the inert gas at this point serves to vaporize part of the halide which is then carried over the wire guide tube and into the arc area. In addition to the heating effect which the inert gas has in carrying sufficient halide vapor into the arc area, heat is also reflected from the arc and conducted from the cup and guide tube to the cylinder to assist in raising the vapor pressure and hence provide sufficient halide vapor in the inert gas stream to effect the desired result.

The amount of halide vapor which is introduced into the arc can be adjusted by regulation of the size of the power cable 1 for a given current rating, the rate of flow of inert gas, the proximity of the halide-containing cylinder 9 to the end of the cup 3 and relative to the arc, and the length of the cylinder.

Figure 7:

As a specific example of the use of the modified welding head or gun described hereinabove, square-butt welds were made between 1/4" plate sections having a chemical composition of approximately 4.5% magnesium, 0.7% manganese, balance aluminum and normal impurities. The electrode filler metal wire used had a chemical composition of about 5.2% magnesium, 0.1% manganese, balance aluminum and normal impurities. The halide provided in the cylinder was aluminum trichloride and the inert gas used was argon with a rate of flow of about 80 cubic feet per hour. The welding gun was operated with a welding current of about 225 amperes and an arc voltage of about 24 volts. Upon removing the weld bead from the welds and fracturing the welds by subjecting them to tensile stress, the average mechanical properties of the welds were found to be about 42,300 p. s. i. ultimate tensile strength, 22,250 p. s. i. yield strength, and 13.5% elongation. The soundness of the welds produced is illustrated by Figure 7 which is a representative radiograph of these welds.

An additional modification of conventional inert gas shielded arc welding guns comprises merely providing a cylinder containing the halide similar to cylinder 9 of Figure 6 within the gun barrel and heating it by means of a resistance heating element surrounding the cylinder. The inert gas passed to the gun in conventional manner would be caused to pass through the heated halide material and carry vapors of the halide into the arc area. It will be understood that various other modifications could be made to existing welding guns to incorporate the halide source therein.

It will thus be seen from the hereinabove description that by practice of the instant invention the soundness of aluminum and aluminum alloy welds made by the inert gas shielded arc welding process has been significantly increased and has made possible the consistent production of such high quality welds. The expression "aluminum alloys" as used herein refers to alloy compositions wherein the constituent aluminum is present in amount of at least 50% and generally is present in amount of at least 90%.

It will be understood that various changes, modifications and alterations may be made in the instant invention without departing from the spirit and scope thereof and, as such, the invention is not to be limited except by the appended claims, wherein what is claimed is:

1. In the method of inert gas shielded arc welding of aluminum and aluminum alloys wherein an arc is established between an electrode and the workpiece and an inert gas is simultaneously fed to shield the arc and weld pool, the improvement comprising adding to said inert gas shield a small but effective amount of at least one halide, said halide being essentially free of the elements carbon and hydrogen and said halide being added to said inert gas by providing the halide in liquid state and bubbling the inert gas therethrough, whereby a weld is produced which possesses substantially greater soundness than a weld made by the same method but wherein the inert gas is devoid of said halide.

2. In apparatus for inert gas shielded arc welding including an electrode, means for feeding an inert gaseous medium to shield the arc between the electrode and the workpiece, and means for supplying direct current to the electrode and workpiece at reversed polarity, the improvement comprising providing a body of halide material which is vaporizable as the halide, said halide being essentially free of the elements carbon and hydrogen, means for heating said halide to produce halide vapor, and means for adding said halide vapor to said inert gaseous medium.

3. A consumable electrode for use in the inert gas shielded arc welding of aluminum and aluminum alloys comprising an elongated member composed of a shell of a metal selected from the group consisting of aluminum, aluminum alloys, and mixtures thereof, and a core of a halide selected from the group consisting of sodium chloride, magnesium chloride and aluminum chloride.

4. A consumable electrode according to claim 3 wherein said halide is magnesium chloride.

5. The method of welding aluminum and aluminum alloys with an electric arc which comprises establishing an arc between an electrode and the workpiece, feeding filler metal into said arc, and simultaneously providing a protective gaseous medium about the arc and the weld pool, said gaseous medium consisting essentially of inert gas and gaseous halogen, said gaseous halogen being present in amount from about 0.01% to 2.0% by volume of said gaseous medium.

6. The method according to claim 5 wherein said gaseous halogen is chlorine.

7. The method according to claim 5 wherein said gaseous halogen is present in amount from about 0.05% to 0.5% by volume of said gaseous medium.

8. The method according to claim 7 wherein said gaseous halogen is chlorine.

9. The method of welding aluminum and aluminum alloys with an electric arc which comprises supplying direct current at reversed polarity to a consumable electrode and a workpiece, feeding the electrode toward said work piece to maintain said arc as a metal is transferred from said electrode to said work piece and providing a protective gaseous medium about the arc and weld pool produced thereby, said gaseous medium consisting essentially of inert gas and gaseous halogen, said gaseous halogen being present in amount from about 0.01% to 2.0% by volume of said gaseous medium.

10. A method according to claim 9 wherein said gaseous halogen is chlorine.

11. The method according to claim 9 wherein said gaseous halogen is present in amount from about 0.05% to 0.50% by volume of said gaseous medium.

12. The method according to claim 11 wherein said gaseous halogen is chlorine.

13. The method of welding aluminum and aluminum alloys with an electric arc which comprises establishing an arc between an electrode and the work piece, feeding filler metal into said arc, simultaneously providing an inert gas shield about the arc and the weld pool, and adding to said gas shield at least one halide, said halide containing essentially none of the elements carbon and hydrogen and being added in amount equal to the provision of halogen in gaseous state in amount of from about 0.01% to 2.0% by volume of said gas shield.

14. The method according to claim 13 wherein said halide is added to amount equal to the provision of halogen in gaseous state in amount from about 0.05% to 0.5% by volume of said gaseous medium.

15. The method according to claim 13 wherein said halide is selected from the group consisting of magnesium chloride, sodium chloride, aluminum chloride, zirconium tetrachloride, silicon tetrachloride, titanium tetrachloride, boron trichloride, and boron trifluoride.

16. In the method of inert gas shielded arc welding of aluminum and aluminum alloys which comprises establishing an arc between an electrode and a work piece and simultaneously providing a protective gaseous medium about the weld zone, the improvement comprising providing in said protective medium gaseous halogen, said halogen being present in amount not less than about 0.01% by volume of the gaseous medium.

17. The method according to claim 16 wherein said gaseous halogen is chlorine.

18. In the method of inert gas shielded arc welding of aluminum and aluminum alloys wherein an arc is established between an electrode and a work piece and an inert gas shield is simultaneously provided about the weld zone, the improvement comprising providing in said inert gas shield at least one halide, said halide containing essentially none of the elements carbon and hydrogen and being provided in amount equal to the provision of halogen in gaseous state in amount of not less than about 0.01% by volume of the shielding gas.

19. In the method of welding aluminum and aluminum alloys with an electric arc which comprises establishing an arc between a consumable electrode and a work piece and simultaneously providing a protective gaseous medium about the weld zone, the improvement comprising providing chlorine gas in said protective gaseous medium, said chlorine gas being present in amount of not less than about 0.01% by volume of the gaseous medium.

20. The method of inert gas shielded arc welding of metals which comprises establishing an arc between an electrode and a work piece, feeding filler metal into said arc, and simultaneously providing a protective gaseous medium about the weld zone, said gaseous medium comprising inert gas and chlorine gas, said chlorine gas being present in amount not less than about 0.01% by volume of the gaseous medium.

21. In the method of inert gas shielded arc welding of aluminum and aluminum alloys wherein an arc is established between an electrode and a work piece and an inert gaseous medium is simultaneously fed to shield the weld zone, the improvement comprising providing in said gas shield at least one halide which is essentially free of the elements carbon and hydrogen and selected from the group consisting of magnesium chloride, sodium chloride, aluminum chloride, zirconium tetrachloride, silicon tetrachloride, titanium tetrachloride, boron trichloride and boron trifluoride, said halide being provided in a small but effective amount up to an amount equal to the provision of halogen in gaseous state in amount of about 2% by volume of said gas shield, whereby a weld is produced having a substantial reduction in porosity as distinguished from the weld made wherein the gas shield is devoid of said halide.

22. In the method of inert gas shielded arc welding of aluminum and aluminum alloys wherein an arc is established between an electrode and a metal work piece and an inert gaseous medium is simultaneously fed to shield the weld zone, the improvement comprising providing in said gas shield a small but effective amount of chlorine gas up to about 2% by volume of the gaseous medium, whereby a weld is produced possessing substantially greater soundness as distinguished from the weld made wherein the gaseous medium is devoid of said chlorine.

References Cited in the file of this patent

UNITED STATES PATENTS

| Number | Name | Date |
|---|---|---|
| 123,296 | Schurr et al. | Jan. 30, 1872 |
| 1,882,601 | Hollup | Oct. 11, 1932 |
| 2,497,629 | Rieppel | Feb. 14, 1950 |
| 2,498,199 | Block | Feb. 21, 1950 |
| 2,504,868 | Muller | Apr. 18, 1950 |
| 2,576,793 | Jordan | Nov. 27, 1951 |
| 2,612,583 | Bernard | Sept. 30, 1952 |
| 2,694,763 | Muller | Nov. 16, 1954 |
| 2,694,764 | Muller | Nov. 16, 1954 |
| 2,727,125 | Muller | Dec. 13, 1955 |
| 2,768,278 | Gaines | Oct. 23, 1956 |

UNITED STATES PATENT OFFICE
CERTIFICATE OF CORRECTION

Patent No. 2,852,659                September 16, 1958

Lloyd H. Belz et al.

It is hereby certified that error appears in the printed specification of the above numbered patent requiring correction and that the said Letters Patent should read as corrected below.

Column 5, line 47, for "designed" read -- designated --.

Signed and sealed this 31st day of January 1961.

(SEAL)
Attest:

KARL H. AXLINE
Attesting Officer

ROBERT C. WATSON
Commissioner of Patents